June 30, 1931.  L. C. PRICE  1,812,802

TEMPERATURE REGULATOR FOR HOLLOW ROTATABLE ELEMENTS

Filed March 11, 1929

Inventor
L. C. Price
By
Cameron, Kerkam and Sutton
Attorneys

Patented June 30, 1931

1,812,802

UNITED STATES PATENT OFFICE

LEWIS CAIRL PRICE, OF BOSTON, MASSACHUSETTS, ASSIGNOR TO THE FULTON SYLPHON COMPANY, OF KNOXVILLE, TENNESSEE, A CORPORATION OF DELAWARE

TEMPERATURE REGULATOR FOR HOLLOW ROTATABLE ELEMENTS

Application filed March 11, 1929. Serial No. 346,220.

This invention relates to temperature regulators for rotatable members, and more particularly to temperature regulators for hollow rotatable rolls, drums and the like which are designed to be maintained at a predetermined temperature by the application of a heating medium to the interior thereof, as in the case of calender rolls, slasher drums and the like.

As in the case of calender rolls for paper making machines, for example, wherein it is customary to heat the rolls by the admission of steam to the interior thereof, it is very important, in order to obtain uniformity of product, to maintain the rolls at a substantially uniform temperature. The regulation of the temperature of such rolls, drums and the like, however, by thermostatic devices applied thereto is complicated by the rotation thereof and the difficulty of connecting a thermostatic element subjected to the temperature of the rotating element with the stationary element to be controlled, such as a steam valve. It has been proposed to subject a thermostat to the temperature of the medium within the rotating element by making a bearing of said element hollow and protruding a long tubular thermostatic element through the hollow bearing into the interior of the drum, but elements of this type are subject to many objections among which may be noted the difficulty in maintaining connections and the difficulty of sufficiently supporting and preventing vibration of such a long tubular element from its outer end only. Hence it has been customary to regulate the temperature of such rotating elements by thermostatic members applied to the exterior thereof, as by rubbing contact therewith, or by subjecting the thermostat to the temperature of the heating medium after it leaves the rotating element, as by interposing a thermostat in the condensate line, but devices of this character are open to various objections, such as the difficulty of maintaining close and accurate temperature control where the thermostat is also subjected to external temperature.

It is an object of this invention to provide a regulator for rotating drums, rolls and the like which are heated interiorly thereof, which is subjected to the temperature conditions, or pressure conditions, or both, within the rotating element, while avoiding the difficulties heretofore experienced in attempting to support a thermostat within the rotating element from the exterior thereof, or in depending upon superficial contact with the rotating element, or in relying upon temperature regulation from the temperature of the condensate.

Another object of this invention is to provide a temperature regulator of the type characterized which is simple and rugged in construction and accurate and efficient in operation.

Other objects will appear as the description of the invention proceeds.

The invention is capable of receiving a variety of mechanical expressions, one of which is shown on the accompanying drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures:—

Figure 1:
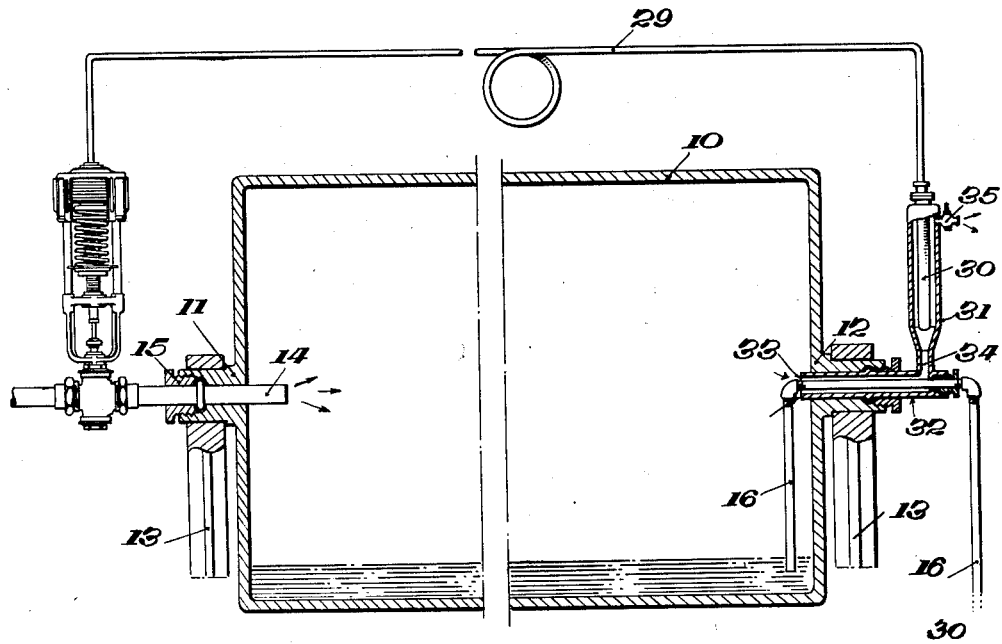
Fig. 1 is a schematic sectional elevation illustrating an embodiment of the present invention.
Figure 2:
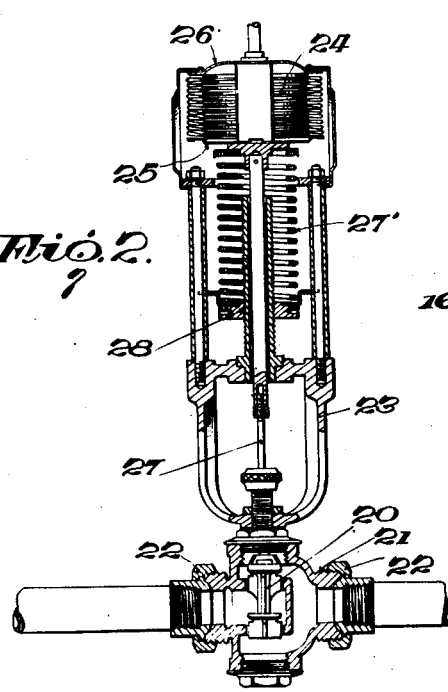
Fig. 2 is an elevation, partly in section, illustrating more in detail the valve mechanism and associated parts.
Figure 3:
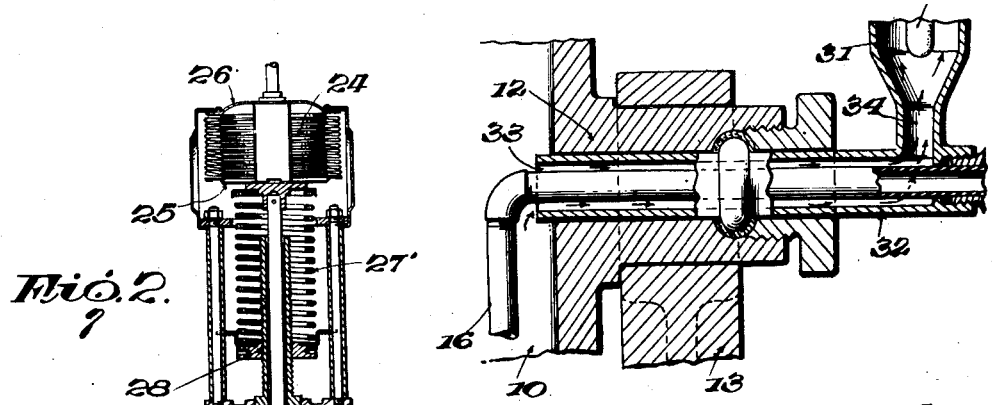
Fig. 3 is an enlarged sectional view illustrating the support for the control chamber.

In the form shown, 10 indicates, more or less diagrammatically, any suitable hollow cylinder, drum or roll, the temperature interiorly of which is to be controlled, said cylinder being shown as provided with hollow hubs 11 and 12 rotatably mounted by any suitable form of bearings in brackets 13. Projecting through the hollow hub 11 is a pipe 14, which may be held against rotation in any suitable way and has bearing contact with the interior wall of the hollow hub 11, a suitable packing gland being diagrammatically illustrated at 15. Pipe 14 is for conveying any suitable heating medium, such as steam, to the interior of the drum. In the form illustrated, the condensate in the steam collects in the drum and is withdrawn therefrom by means of a pipe 16 which projects within the drum downwardly so as to have its lower end immersed in the accumulating condensate, said pipe passing through the hollow hub 12 and leading to any suitable trap, pump, etc. The structure so far described is known to the art and further description thereof is deemed unnecessary. It is to be expressly understood, however, that the rotatable element, its support and the means for supplying and withdrawing the heating medium may be of any known or suitable construction.

In accordance with the present invention, a valve of any suitable construction is interposed in the supply line, being shown as a double seating valve 20 in a suitable valve housing 21 connected into the supply line by unions 22. The bonnet of said valve carries a frame 23 of any suitable construction which affords a support for an expansible and collapsible vessel 24, shown as having a deeply corrugated, highly flexible, tubular metal wall and stationary and movable end walls 25 and 26, respectively. The movable end wall 25 is operatively connected to the valve stem 27 in any suitable way, and in the form shown the expansion of the vessel 24 is opposed by a coil spring 27' which bears against an adjustable nut 28 so that the tension of said spring may be varied to predetermine the pressure required to expand the vessel 24 and effect the closure of the valve 20.

Vessel 24 communicates through a pipe 29, which may be either of rigid or of flexible construction, with an element 30 which is responsive to temperature, or pressure, or both. In the form shown, said element 30 is shown as a bulb which is designed to contain a thermo-sensitive fluid, so that upon changes of temperature of the element 30 pressure changes will be transferred through the interposed pipe 29 to the chamber 24. If desired, however, the element 30 may take the form of an expansible and collapsible element which is responsive to pressure, or to combined temperature and pressure. While the element 30 will hereafter be referred to as a temperature responsive element, it will be expressly understood that the term is to be taken as generic to elements responsive to pressure, or to combined temperature and pressure, as well as to temperature alone.

In order to subject said temperature responsive element 30 to the conditions within the rotatable element 10, without protruding said element 30 within said element 10, the hub 12 of said rotatable element is provided in any suitable way with means of communication between the interior of said element and a control chamber 31 disposed exteriorly of the rotatable element. If desired, the pipe 16 which normally passes through this hub may be formed as a two-passage conduit, one of the passages opening directly into the interior of the drum, but in the form shown, the pipe 16 is carried and surrounded by a second pipe 32 which is received within the hollow bore of the hub 12 and makes bearing contact therewith, and said pipe section 32 may be held against rotation in any suitable way. A packing gland 33, of any suitable construction, is provided at the outer end of the pipe section 32, where the pipe 16 passes therethrough, and said pipe section affords an annular conduit around said pipe 16, which conduit opens freely at its inner end into the interior of the drum, as shown at 33, while adjacent its opposite end said conduit communicates with the control chamber 31 through a hollow neck 34. Where the element 30 is responsive to pressure, the interior of the chamber 31 will be at the same pressure as the interior of the rotatable element 10, but where dependence is placed upon the interior of the chamber 31 being at the same temperature as the interior of the rotatable element 10, a pet cock or other suitable means 35 is provided adjacent the outer extremity of said chamber 31 so that the desired flow of fluid from the rotatable element 10 to and through the chamber 31 may be effected. Said pet cock may open directly into the atmosphere, or it may communicate with a pipe which leads into a suitable point of the condensate line.

In operation, steam flows through the inlet pipe 14 into the interior of the rotatable element and heats the same, the condensate accumulating in the bottom of said element, from which it is withdrawn by the pipe 16. Owing to the open communication between the interior of said rotatable element 10 and the chamber 31, and the circulation through said chamber 31 that is present when the pet cock 35 is open, the element 30 will be subjected to temperature conditions which are substantially identical with those within the interior of said rotatable element. Therefore, changes of temperature within said rotatable element are promptly communicated to the element 30 and, by reason of changes of pressure therein resulting from the changes of temperature, the expansible and collapsible vessel 24 is promptly subjected to pressure variations which are in direct proportion to the temperature variations within the rotatable element. By adjusting the spring 27 the extent of pressure variation necessary to effect a movement of the valve 20 may be closely predetermined, and thereby the supply of heating medium to the interior of the rotatable element 10 can be nicely and accurately regulated in conformity with the temperature conditions within the same. While a particular form of thermostat has been illustrated and described in detail, it is to be expressly understood that any suitable form of device may be employed for transmitting temperature variations or pressure variations or both from the chamber 31 to the valve 20 or other element to be controlled, which may be disposed at any suitable point in the line which supplies the heating medium.

It will, therefore, be perceived that a temperature regulator for a hollow rotatable element of the type characterized has been provided which enables the temperature within said element to be closely and accurately regulated by subjection of the control element to the actual conditions within the rotating element without involving any of the difficulties heretofore experienced where an effort has been made to protrude the control element into the interior of the rotating element, supporting said control element from the exterior of said rotating element. At the same time, the regulation is much more accurate than possible where dependence has been placed upon superficial contact with the rotating element or subjection of the control element to the temperature of the condensed heating medium withdrawn from the rotating element. Also, the construction is simple and rugged and capable of accurate and efficient regulation of the temperature within the rotatable element.

While the embodiment of the invention illustrated on the drawings has been described with considerable particularity, it is to be expressly understood that the invention is not restricted thereto, as the same is capable of receiving a variety of mechanical expressions, some of which will now readily suggest themselves to those skilled in the art. Thus, as above pointed out, the element 30 may be any suitable device responsive to pressure, or the pressure in said rotatable element as transmitted by the conduit 32 may be piped directly, either with or without the interposition of a chamber 31, to the pressure responsive element 24 operatively connected with the valve or other controller. Changes may be made in the details of construction, arrangement and proportion of parts, etc., without departing from the spirit of this invention. Reference is therefore to be had to the appended claims for a definition of said invention.

What is claimed is:

1. In a device of the type specified, in combination with a hollow rotatable element, means for rotatably mounting the same, means for supplying heating medium to the interior of said rotatable element and an exhaust for said medium, a controller for the heating means, and means responsive to the temperature conditions within said element for actuating said controller, said means comprising a chamber disposed exteriorly of said rotatable element, means, separate from the exhaust, in communication with said chamber and in open communication with the interior of said element where the heating medium within said element may at all times flow to said chamber, and a temperature responsive element in said chamber operatively connected to said controller.

2. In a device of the type specified, in combination with a hollow rotatable element, bearing means for rotatably mounting the same, means for supplying heating medium to the interior of said rotatable element and means for exhausting said medium from the interior thereof, a controller for the heating means, and means responsive to the temperature conditions within said element for actuating said controller, said means comprising a chamber disposed exteriorly of said rotatable element, a conduit, separate from said exhaust means, passing through a bearing of said rotatable element for placing said chamber at all times in open communication with the interior of said rotatable element, and a temperature responsive element in said chamber operatively connected to said controller.

3. In a device of the type specified, in combination with a hollow rotatable element, means for rotatably mounting the same, means for heating the interior thereof, and an exhaust conduit leading therefrom, a controller for the heating means, and means responsive to the temperature conditions within said element for actuating said controller, said means comprising a chamber disposed exteriorly of said rotatable element, a conduit separate from said exhaust conduit and communicating at its opposite ends with said chamber and the interior of said rotatable element, a temperature responsive element in said chamber operatively connected to said controller, and means providing an outlet for said chamber whereby the heating medium in said element will be caused to flow through said chamber in heat interchanging relation with said temperature responsive element.

4. In a device of the type specified, in combination with a hollow rotatable element, means for rotatably mounting the same and a system including inlet and outlet conduits for conveying heating medium to and from the interior of said element, a valve in said system, a pressure responsive device for opening and closing said valve, and means for operating said pressure responsive device in accordance with variations in conditions within said rotatable element, said means comprising a chamber disposed exteriorly of said rotatable element and having a connection, separate from said conduits, with the interior of said element at a point where the heating medium therein may always flow to said chamber, and an element disposed in said chamber and directly connected with said pressure responsive device.

5. In a device of the type specified, in combination with a hollow rotatable element, means for rotatably mounting the same and a system including inlet and outlet conduits for conveying heating medium to and from the interior of said element, a valve in said system, a pressure responsive device for opening and closing said valve, and means for operating said pressure responsive device in accordance with temperature variations within said rotatable element, said means comprising a chamber disposed exteriorly of said rotatable element, a connection, separate from said conduits, between said chamber and the interior of said element at a point where the heating medium therein may always flow to said chamber, a bulb in said chamber containing a temperature responsive medium, and a pipe directly connecting said bulb with said pressure responsive device.

6. In a device of the type specified, in combination with a hollow rotatable element, means for rotatably mounting the same, a conduit for conveying heating medium to the interior of said element and a conduit for withdrawing said medium therefrom, a valve in said inlet conduit, a pressure responsive device for opening and closing said valve, and means for operating said pressure responsive device in accordance with variations in conditions within said rotatable element, said means comprising a chamber disposed exteriorly of said rotatable element, an element in said chamber connected with said pressure responsive device, and a conduit having its opposite ends in communication with said chamber and the interior of said rotatable element and surrounding said outlet conduit for withdrawing said medium from said rotatable element.

7. In a device of the type specified, in combination with a hollow rotatable element, means for rotatably mounting the same, a conduit for conveying heating medium to the interior of said element and an outlet for the heating medium, a valve in said conduit, a pressure responsive device for opening and closing said valve, and means for operating said pressure responsive device in accordance with variations in conditions within said rotatable element, said means comprising a chamber disposed exteriorly of said rotatable element, means in said chamber responsive to said variations and connected to said pressure responsive means, a conduit separate from said outlet and in communication with said chamber and the interior of said rotatable element, and means providing an outlet from said chamber whereby the heating medium in said rotatable element will be caused to flow through said chamber.

8. In a device of the type specified, in combination with a hollow rotatable element, bearing means for rotatably mounting the same, a steam pipe communicating with the interior of said rotatable element through one of said bearings and an exhaust pipe communicating with the interior of said rotatable element through the other of said bearings, a valve in said steam line, a pressure responsive device for operating said valve, and means for operating said pressure responsive device in accordance with the variations of conditions within said rotatable element, said means comprising a conduit separate from said exhaust pipe and communicating with said element at a point where steam may always flow thereinto, and means subjected to the steam flowing into said conduit and operatively connected to said pressure responsive means.

9. In a device of the type specified, in combination with a hollow rotatable element, means for rotatably mounting the same and a heating means including conduits for conveying heating medium to and from the interior of said element, a controller for the heating means, a pressure responsive device for operating said controller, and means for operating said pressure responsive device in accordance with the variations in conditions within said rotatable element, said means comprising a conduit separate from said first named conduits and communicating with the interior of said rotatable element at a point where the heating medium in said element may always flow into said conduit, and means interposed between said conduit and said pressure responsive device whereby said pressure responsive device is operated in accordance with the variations in conditions within said rotatable element.

In testimony whereof I have signed this specification.

LEWIS CAIRL PRICE.